US008935055B2

(12) United States Patent
Raghunathan et al.

(10) Patent No.: US 8,935,055 B2
(45) Date of Patent: Jan. 13, 2015

(54) METHOD AND APPARATUS FOR VEHICLE WITH ADAPTIVE LIGHTING SYSTEM

(75) Inventors: Badri Raghunathan, Redwood City, CA (US); Enylton M. Coelho, Mountain View, CA (US); Jan Becker, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 1345 days.

(21) Appl. No.: 12/358,488

(22) Filed: Jan. 23, 2009

(65) Prior Publication Data

US 2010/0188864 A1 Jul. 29, 2010

(51) Int. Cl.
*B60Q 1/08* (2006.01)

(52) U.S. Cl.
CPC ............ *B60Q 1/085* (2013.01); *B60Q 2300/32* (2013.01); *B60Q 2300/42* (2013.01); *B60Q 2300/45* (2013.01); *B60Q 2400/50* (2013.01)
USPC ................ 701/49; 701/45; 382/103; 382/104

(58) Field of Classification Search
USPC ................................ 701/49, 31; 382/103, 104
See application file for complete search history.

(56) References Cited

U.S. PATENT DOCUMENTS

| | | | | |
|---|---|---|---|---|
| 5,781,195 A | * | 7/1998 | Marvin ......................... | 345/428 |
| 5,931,572 A | | 8/1999 | Gotoh | |
| 6,161,071 A | | 12/2000 | Shuman et al. | |
| 6,285,778 B1 | * | 9/2001 | Nakajima et al. ............. | 382/104 |
| 6,539,288 B2 | * | 3/2003 | Ishida et al. ..................... | 701/1 |
| 6,675,081 B2 | | 1/2004 | Shuman et al. | |
| 6,774,772 B2 | * | 8/2004 | Hahn ............................. | 340/439 |
| 6,791,511 B2 | * | 9/2004 | Eschler et al. ..................... | 345/8 |
| 6,861,809 B2 | | 3/2005 | Stam | |
| 6,891,960 B2 | * | 5/2005 | Retterath et al. .............. | 382/104 |
| 6,969,183 B2 | * | 11/2005 | Okubo et al. .................. | 362/466 |
| 6,993,255 B2 | * | 1/2006 | Braun et al. ..................... | 396/61 |
| 6,999,602 B2 | * | 2/2006 | Yoshida et al. ............... | 382/104 |
| 7,292,723 B2 | * | 11/2007 | Tedesco et al. ............... | 382/159 |
| 7,334,197 B2 | * | 2/2008 | Robertson et al. ............. | 715/853 |
| 7,561,180 B2 | * | 7/2009 | Koike ........................... | 348/148 |
| 7,633,383 B2 | * | 12/2009 | Dunsmoir et al. ............ | 340/435 |
| 7,708,435 B2 | * | 5/2010 | Watanabe ..................... | 362/466 |
| 7,782,184 B2 | * | 8/2010 | Wittorf et al. ................. | 340/468 |

(Continued)

OTHER PUBLICATIONS

Hager, Gregory D., A Modular System for Robust Positioning Using Feedback from Stereo Vision, IEEE Transactions on Robotics and Automation, vol. 13, No. 4, Aug. 1997, pp. 582-595 (14 pages).

(Continued)

*Primary Examiner* — Helal A Algahaim
*Assistant Examiner* — Dale Hilgendorf
(74) *Attorney, Agent, or Firm* — Maginot Moore & Beck LLP

(57) ABSTRACT

In one embodiment, an adaptive external vehicle lighting system includes a vehicle communication network, a memory including program instructions for generating a model of a vehicle and the environment outside of the vehicle, identifying an object of interest based upon the generated model, analyzing rendering criteria associated with the identified object of interest, and rendering object of interest data based upon the analysis, a processor operably connected to the vehicle communication network and to the memory for executing the program instructions, and at least one rendering system operably connected to the processor through the vehicle communication network for rendering the object of interest data using an associated external lighting system of the vehicle.

20 Claims, 5 Drawing Sheets

(56) References Cited

U.S. PATENT DOCUMENTS

| | | | |
|---|---|---|---|
| 7,792,621 B2* | 9/2010 | Sugimoto et al. | 701/49 |
| 2002/0039295 A1* | 4/2002 | Kobayashi et al. | 362/465 |
| 2002/0049534 A1* | 4/2002 | Yuda et al. | 701/209 |
| 2003/0065432 A1* | 4/2003 | Shuman et al. | 701/48 |
| 2003/0169213 A1* | 9/2003 | Spero | 345/7 |
| 2004/0022416 A1* | 2/2004 | Lemelson et al. | 382/104 |
| 2004/0114921 A1* | 6/2004 | Braun et al. | 396/661 |
| 2004/0190767 A1* | 9/2004 | Tedesco et al. | 382/156 |
| 2005/0086000 A1* | 4/2005 | Tsuchiya et al. | 701/211 |
| 2005/0149251 A1* | 7/2005 | Donath et al. | 701/200 |
| 2005/0278112 A1* | 12/2005 | Gern et al. | 701/200 |
| 2006/0018511 A1* | 1/2006 | Stam et al. | 382/104 |
| 2006/0111841 A1* | 5/2006 | Tseng | 701/301 |
| 2006/0239509 A1* | 10/2006 | Saito | 382/104 |
| 2006/0248028 A1* | 11/2006 | Tedesco et al. | 706/14 |
| 2007/0047809 A1* | 3/2007 | Sasaki | 382/170 |
| 2007/0102214 A1* | 5/2007 | Wittorf et al. | 180/167 |
| 2007/0111778 A1* | 5/2007 | Walker et al. | 463/16 |
| 2008/0024606 A1* | 1/2008 | Kawasaki | 348/148 |
| 2008/0097699 A1* | 4/2008 | Ono | 701/300 |
| 2008/0103661 A1* | 5/2008 | Sugimoto et al. | 701/49 |
| 2008/0175012 A1 | 7/2008 | Shimaoka et al. | |
| 2008/0198372 A1 | 8/2008 | Pan | |
| 2008/0204208 A1* | 8/2008 | Kawamata et al. | 340/435 |
| 2008/0273757 A1* | 11/2008 | Nakamura et al. | 382/104 |
| 2009/0128449 A1* | 5/2009 | Brown et al. | 345/8 |
| 2009/0135092 A1* | 5/2009 | Uematsu et al. | 345/7 |
| 2009/0160630 A1* | 6/2009 | Bauer et al. | 340/435 |
| 2010/0034468 A1* | 2/2010 | Boncyk et al. | 382/217 |
| 2010/0045482 A1* | 2/2010 | Strauss | 340/903 |
| 2010/0060487 A1* | 3/2010 | Augst | 340/937 |
| 2010/0117812 A1* | 5/2010 | Laubinger et al. | 340/435 |
| 2010/0217529 A1* | 8/2010 | Stroila et al. | 702/5 |
| 2010/0253539 A1* | 10/2010 | Seder et al. | 340/903 |

OTHER PUBLICATIONS

Dick et al., Model Refinement from Planar Parallax, British Machine Vision Conference, pp. 1-10 (10 pages).

* cited by examiner

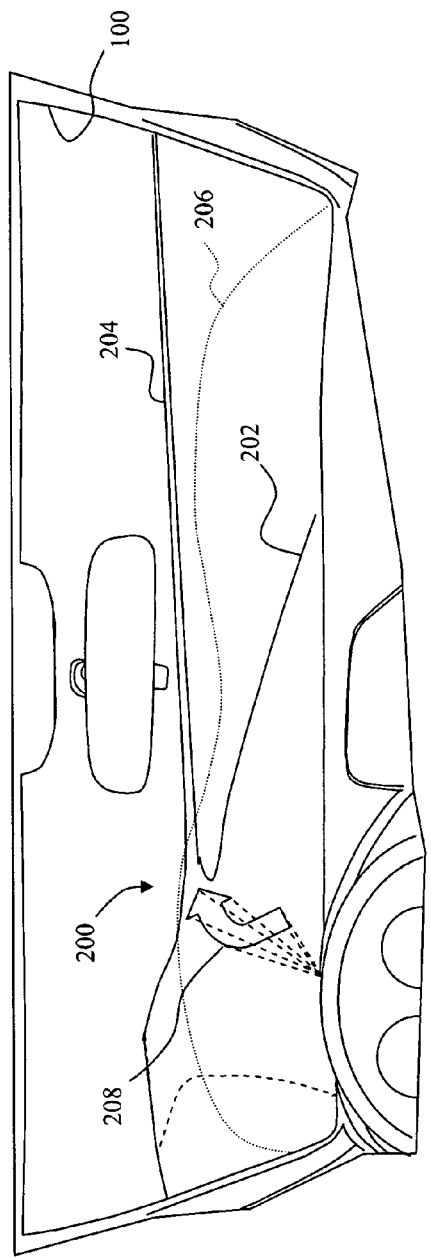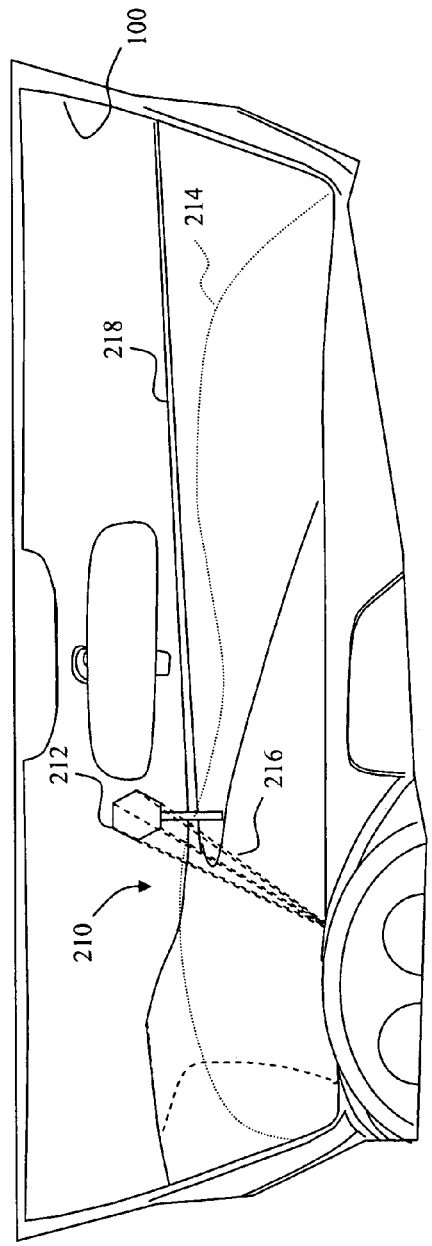
FIG. 4
FIG. 5

METHOD AND APPARATUS FOR VEHICLE WITH ADAPTIVE LIGHTING SYSTEM

FIELD OF THE INVENTION

The present invention relates generally to vehicles and more particularly to information systems for vehicles.

BACKGROUND OF THE INVENTION

Vehicle information systems have been developed that provide various types of information to operators of those vehicles. In particular, navigation systems have been developed. One type of navigation system, a self-contained navigation system, uses an on-board map, typically stored on a removable medium such as a compact optical disk (e.g., CD-ROM). The navigation system uses the on-board map to plan a route from a starting point to a destination, which is specified by the operator of the vehicle. Updating an autonomous system's map, for example to add or correct information, typically involves replacing the removable medium.

The data within such navigation systems are provided to the vehicle operator in a number of different approaches. In one approach, the operator is provided with an audible sequence of discrete instructions. Thus, upon approaching an intersection, the vehicle information system provides an audible instruction as to the direction in which to turn.

Another approach to route guidance uses a displayed map on which the planned route and the vehicle's location are dynamically displayed. The operator uses the displayed map to decide when and where to turn in order to follow the planned route. These systems may be augmented with audible directions.

Some guidance systems are aided by in-vehicle sensors that are used to estimate the location of the vehicle. For instance, a magnetic compass may be used to estimate the direction of travel, and odometry may be used to estimate the distance traveled. In other systems, the location of the vehicle can be estimated using the Global Positioning System (GPS).

Additional information may be provided to vehicle information systems including traffic related information. By way of example, traffic advisories may be broadcast to specially equipped in-vehicle radio receivers. Moreover, some vehicle information systems include information as to retail locations, such as gas stations, in the vicinity of the vehicle. The recent price of gas at the particular stations may also be provided.

Other vehicle information systems have been developed that provide more comprehensive monitoring of the environment of the vehicle. By way of example, U.S. Pat. No. 6,161,071, issued Dec. 12, 2000 to Shuman et al., which is herein incorporated by reference, discloses a computing architecture for a land-based vehicle. The system disclosed therein includes various types of sensors and data inputs which are used to generate a three dimensional map of the vehicle and its environment. The generated maps can be used to issue warnings to the operator of objects in the vehicle path and to change the direction of headlamps to track a road upon which the vehicle is located.

While a substantial amount of information is available to the operator of a vehicle, the manner in which the data is presented is not optimal. By way of example, navigation system data is typically rendered on a screen which is located below the top of the vehicle dashboard. Accordingly, the operator is forced to look away from the road, increasing the potential of an accident, to observe the displayed data. Additionally, different lighting conditions between the windshield and the display screen can require some period of readjustment before the operator is able to perceive conditions viewable through the windshield. Any such delay reduces the opportunity of the operator to avoid unexpected road hazards.

An advance over the use of a display located below the dashboard for the display of information is the use of virtual displays on the windshield of the vehicle. By way of example, U.S. Pat. No. 6,791,511, issued on Sep. 14, 2004 to Eschler et al., which is herein incorporated by reference, discloses a display device which displays a virtual image on the windshield of a motor vehicle. Thus, information as to the road course in front of the vehicle may be displayed on the windshield. The operator, however, may not be able to visually correlate the virtual image to the actual road course. Additionally, the operator must change focus between the virtual image and the actual road course.

What is needed is a system which automatically guides an operator during operation of a vehicle. What is further needed is a system that can enhance the ability of the operator to easily correlate the data presented to viewable objects. A further need exists for a system which can provide data to the operator of a vehicle without the need to change the focal point of the operator.

SUMMARY OF THE INVENTION

In one embodiment, an adaptive external vehicle lighting system includes a vehicle communication network, a memory including program instructions for generating a model of a vehicle and the environment outside of the vehicle, identifying an object of interest based upon the generated model, analyzing rendering criteria associated with the identified object of interest, and rendering object of interest data based upon the analysis, a processor operably connected to the vehicle communication network and to the memory for executing the program instructions, and at least one rendering system operably connected to the processor through the vehicle communication network for rendering the object of interest data using an associated external lighting system of the vehicle.

In a further embodiment, a method of rendering data outside of a vehicle includes generating a model of a vehicle and the environment outside of the vehicle, identifying an object of interest based upon the generated model, analyzing rendering criteria associated with the identified object of interest, and controlling a first rendering system through a vehicle communication system to render first object of interest data using a first associated external lighting system of the vehicle.

In yet another embodiment, a vehicle information system includes a vehicle communication network, a memory including program instructions for generating a model of a vehicle and a plurality of objects located within an area outside of the vehicle, identifying a first of the plurality of objects as a first object of interest based upon the generated model, analyzing rendering criteria associated with the identified first object of interest, and rendering first object of interest data based upon the analysis, a processor operably connected to the vehicle communication network and to the memory for executing the program instructions, a lighting system configured to provide illumination within the area outside of the vehicle, and a rendering system operably connected to the lighting system and to the processor through the vehicle communication network for rendering the first object of interest data.

The above described features and advantages, as well as others, will become more readily apparent to those of ordi-

BRIEF DESCRIPTION OF THE DRAWINGS

FIG. 4 depicts a plan view through the windshield of the vehicle of FIG. 1 wherein object of interest data in the form of an arrow has been rendered on a roadway by an external light assembly of the vehicle;

FIG. 5 depicts a plan view through the windshield of the vehicle of FIG. 1 wherein object of interest data in the form of a beam of light has been rendered on a sign adjacent to a road on which the vehicle is travelling by an external light assembly of the vehicle;

DETAILED DESCRIPTION

Figure 1:
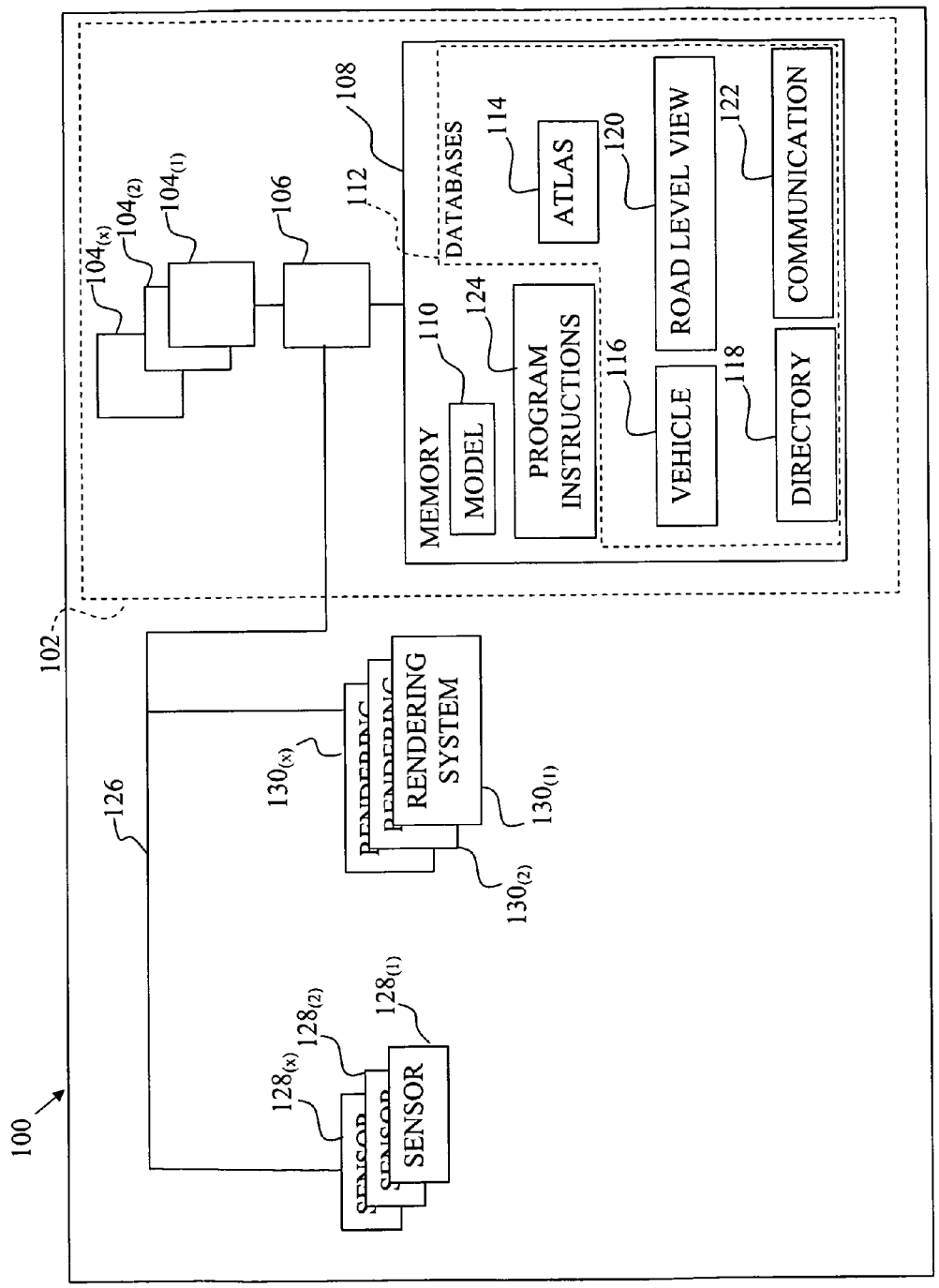
FIG. 1 is a block representation of a vehicle with an exemplary embodiment of a control system in which the subject invention may be used.

Referring to FIG. 1, there is depicted a representation of a vehicle generally designated 100. Without being limiting, the vehicle 100 may be any type of powered vehicle such as a truck, automobile, bus, van, or motorcycle. Without being limiting, the subject invention will be described herein in the context of a motorized automobile.

The vehicle 100 has a control system 102 that includes I/O devices $104_1$-$104_x$, a processing circuit 106 and a memory 108. The I/O devices 104 may include a user interface, graphical user interface, keyboards, pointing devices, remote and/or local communication links, displays, and other devices that allow externally generated information to be provided to the processing circuit 106, and that allow internal information of the control system 102 to be communicated externally.

The processing circuit 106 may suitably be a general purpose computer processing circuit such as a microprocessor and its associated circuitry. The processing circuit 106 is operable to carry out the operations attributed to it herein.

Within the memory 108 is a digital model 110 of the internal and external environment of the vehicle 100. The model 110 is a collection of interrelated data objects representative of, or that correspond to, elements of the vehicle 100, the environment inside of the vehicle 100, and the environment surrounding the vehicle 100. In one embodiment, the digital model 110 is a three dimensional model of the vehicle 100, the environment within the vehicle 100, and the environment outside of the vehicle 100.

Elements of the vehicle 100 represented in the model 110 may include the physical dimensions of the vehicle 100, the position of seats within the vehicle 100, the condition of headlamps, etc. The environment inside of the vehicle 100 may include the number and location of individuals within the vehicle 100, the sizes of the individuals, the status of equipment such as internal lights, defrosters, etc. The "environment outside of a vehicle" means the area of interest surrounding the vehicle. While the dimensions of such an area may vary, the "environment outside of a vehicle" typically refers to an area within a few hundred yards of the vehicle. The environment outside of the vehicle 100 may include the location of the vehicle 100 on a roadway, and buildings, objects, signs, and individuals within one or more zones of interest, etc.

Databases 112 are also located within the memory 108. The databases 112 include an atlas database 114, a vehicle database 116, a building database 118, a road level view database 120 and a communication database 122. In one embodiment, the databases 112 are populated using object oriented modeling. The use of object oriented modeling allows for a rich description of the relationship between various objects. While shown within the vehicle 100, the control system 102 and/or any one or more of the databases 112 may be remote from the vehicle 100.

The atlas database 114 may include data associated with the roads, geographic features, etc. The vehicle database 116 may include data sufficient to form a digital three dimensional representation of the vehicle 100.

The building database 118 may include data associated with retail businesses, wholesale businesses, residences, and other constructed places. This data may include contact information, hours of operation, and merchandise information.

The road level view database 120 may include still images of the environment surrounding the vehicle 100. For example, Google Streetview provides still images taken from an operator's perspective. The road level view database may further include data associated with objects in the images such as the size of the object. For example, traffic signs including stop signs and informational signs may be identified along with data associated with the size of the signage The communication database 122 may be populated with data associated with various information systems which are accessible by the control system 102. Such systems may include satellite systems, microwave systems, RFID systems, etc. For example, RFID systems may include devices imbedded within a roadway or placed proximate the roadway specifically to interact with vehicle information systems.

Program instructions 124 are also included in the memory 108. The program instructions 124, which are described more fully below, are executable by the processing circuit 106 and/or any other components as appropriate.

A communications network 126 provides communications between the control system 102, a plurality of sensors $128_1$-$128_x$, and one or more rendering systems $130_1$-$130_x$ positioned throughout the vehicle 100. In one embodiment, portions of the communications network 126 incorporate wireless communication schemes implemented as a wireless area network. A wireless communication scheme identifies the specific protocols and RF frequency plan employed in wireless communications between sets of wireless devices. To this end, the processing circuit 106 may employ a packet-hopping wireless protocol to effect communication by and among the processing circuit 106, the sensors $128_x$ and the rendering systems $130_x$.

In one embodiment each of the rendering systems $130_1$ and $130_2$ are associated with a respective one of the front headlight assemblies (not shown) of the vehicle. Additional rendering systems $130_x$ may be provided with other external lights or light assemblies as desired. By way of example, fog lights or dedicated rendering system lights may be provided. The rendering systems $130_x$ are configured to operate, in one embodiment, by selective illumination of digital micro-mirror devices. The digital micro-mirror devices may be incorporated in the headlight assemblies (not shown) of the vehicle 100. U.S. Pat. No. 6,861,809, issued on Mar. 1, 2005 to Stam, which is herein incorporated by reference, discloses headlights including digital micro-mirror devices.

The rendering systems $130_x$ control the digital micro-mirrors to generate an illuminated data pattern. The lighting source used to generate the illuminated data patterns of the rendering systems $130_1$ and $130_2$ may be the same lighting source used for generating the main beam of the respective headlight. Alternatively, colored lasers may be provided such that, for example, the illuminated data patterns of the rendering systems $130_1$ and $130_2$ augment the beam pattern generated by the respective headlight.

Figure 2:
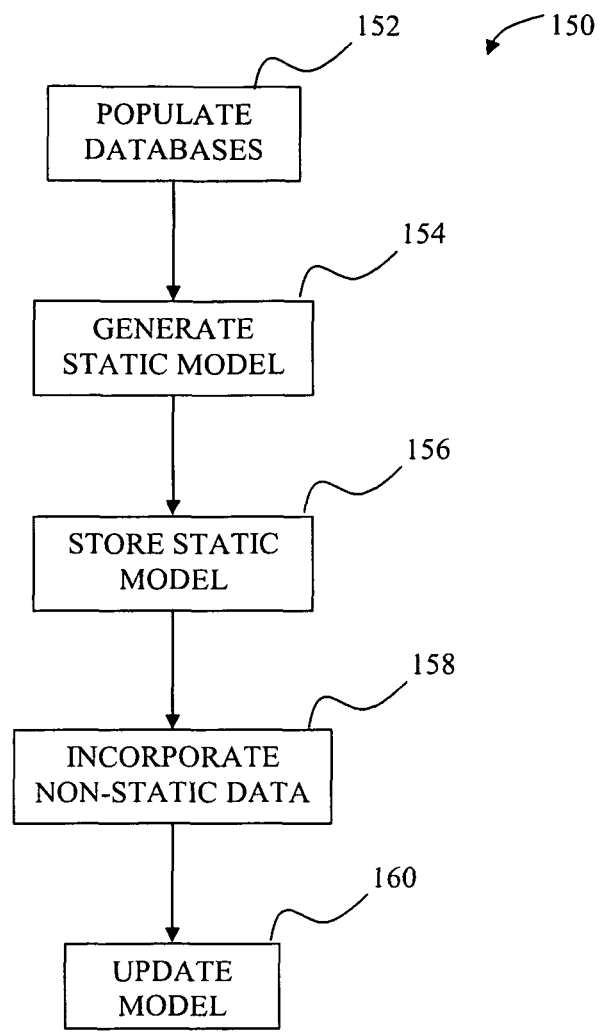
FIG. 2 depicts an exemplary procedure for generating and maintaining a three dimensional digital model of the vehicle of FIG. 1 and the environment inside and outside of the vehicle.

Referring to FIG. 2, there is depicted a flowchart, generally designated 150, setting forth an exemplary manner of establishing and maintaining the digital model 110 according to the present principles. Initially, the databases 112 are populated (block 152). The vehicle database 116 preferably identifies the physical structure of the vehicle 100. To this end, much of the vehicle database may be initially loaded during the initial programming of the control system 102. The remaining databases 112 are also populated, either during initial programming of the control system 102 or in accordance with an update strategy whereby the contents of the databases 112 are a function of the location of the vehicle 100. Thus, the contents of the databases 112 may be updated by data transfers through one or more of the I/O devices $104_x$. Such data transfers may be automatically performed by the control system 102.

A digital model 110 of the vehicle 100 and the environment inside and outside of the vehicle 100 may then be generated (block 154) and stored within the memory 108 (block 156). The digital model 110 at this point is primarily based upon data related to static objects stored within the databases 112. By way of example, static data may be associated with signage, buildings and other manmade structures as a well as geographic detail including mountains, valleys, water features, etc. Static object location and dimensions may be loaded into the model 110 from the databases 112. While static objects may also be sensed by one or more sensors $128_x$, such sensing data is used to confirm data already stored in the databases 112.

Non-static objects are also incorporated into the model 110 (block 158). Non-static objects include other vehicles, pedestrians, and animate and inanimate objects which are not identified as a known static object. Non-static objects, which may or may not be moving, include objects which are sensed by one or more sensors $128_x$ but which cannot be correlated to a known static object. Some non-static objects may also be pre-identified. By way of example, the location of movable seats within the vehicle, occupants of the vehicle, and objects placed in the vehicle may be identified to the control system 102.

The digital model 110, which in one embodiment is a three dimensional model such as is described in the Schuman et al. patent identified above, is then updated (block 160). Maintenance or updating of the digital model 110 may be automated. For example, data within the databases 112 may be automatically obtained through one or more of the I/O devices $104_x$ based, for example, upon the determined location of the vehicle 100.

Additionally, the program instructions 124 may include commands which, when executed by the processor 106, analyze data received from the sensors $128_x$ and classify non-static objects. Such classification may include a "type" code and an "importance" code. A "type" code classifies an object as, for example, animate or inanimate while an "importance" code may assign the object a value based upon a collision potential. The collision potential is based upon distance and direction of the object with respect to the vehicle, the speed and direction of the object, and the speed and direction of the vehicle. Program instructions 124 may further be included which allow the processor 106 to further identify classified objects as, for example, pedestrians, vehicles, etc.

Figure 3:
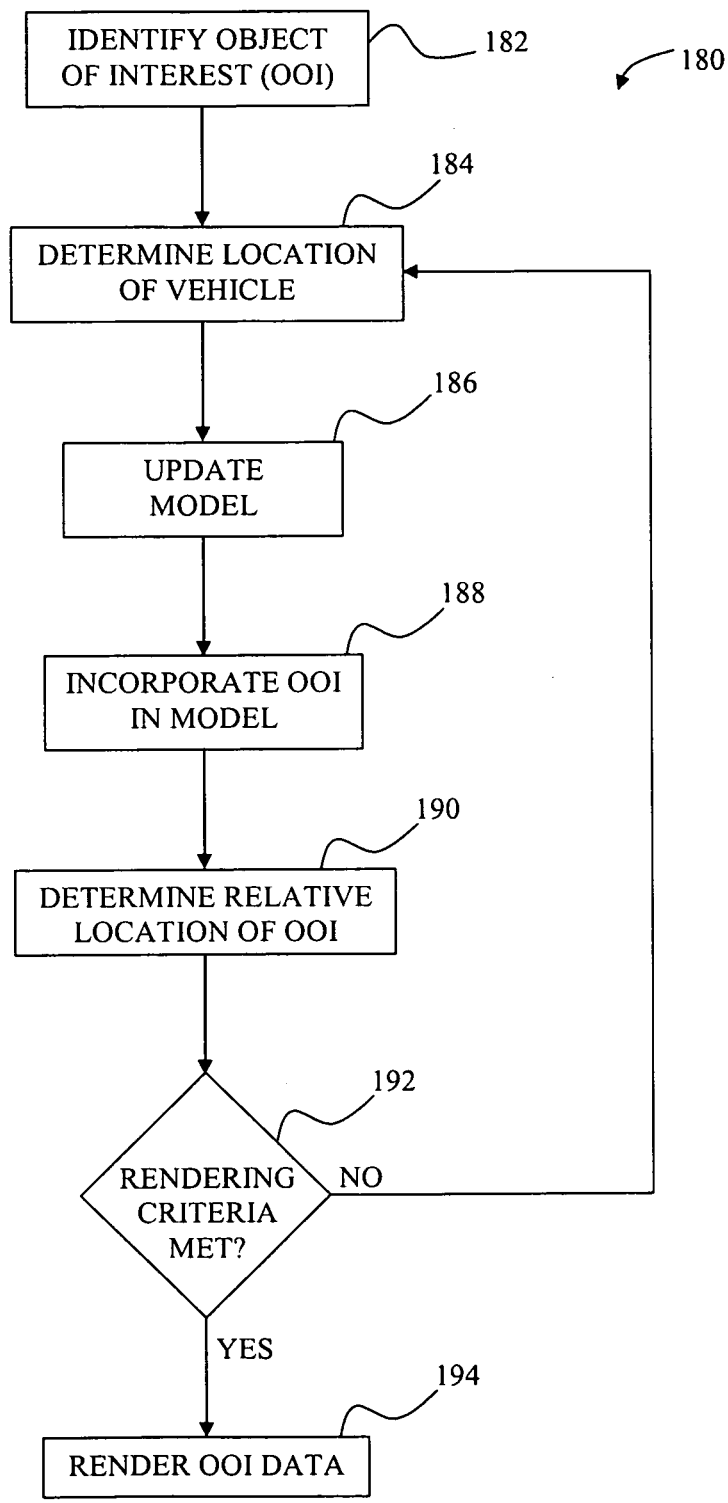
FIG. 3 depicts a procedure for rendering object of interest data outside of a vehicle.

The processor 106 further executes program instructions 124 to execute the procedure 180 of FIG. 3. Initially, an object of interest (OOI) is identified to the control system 102 (block 182). An OOI may be, for example, a turn along a navigation route, a particular store or structure, a location, or a non-static object with a collision potential above a predetermined threshold. The OOI may be identified to the control system 102 using, for example, an I/O device $104_x$. Alternatively, the program instructions 124 may include criteria which, when met by an object, qualify the object as an OOI.

Continuing with the procedure 180, during operation of the vehicle 100, the location of the vehicle 100 is determined (block 184). The processor 106 also collects data from the sensors $128_x$ and the I/O devices $104_x$ to update the digital model 110 (block 186). When the vehicle 100 is located within a predetermined distance of the OOI, the physical location and attributes of an OOI are incorporated into the digital model 110 (block 188). Preferably, sufficient attributes are available to provide a three dimensional representation of the OOI in the digital model 110. The attributes may include, for example, the relative speed of the OOI or other data associated with the OOI. Once the OOI is incorporated into the digital model 110, the processor 106 can ascertain the location of the OOI with respect to the vehicle in virtual three dimensional space (block 190).

The location and attributes of the OOI are then compared with rendering criteria (block 192). If the rendering criteria are not met, then the process continues at block 184 with determination of the vehicle location. If the rendering criteria are met, then OOI data is rendered (block 194).

Rendering criteria is a hierarchical ordering of rules used to determine when OOI data is to be rendered. Rendering criteria may include a variety of considerations. By way of example, the relative velocity and the distance between the OOI and the vehicle 100 may be used to determine whether or not OOI data is rendered as a collision risk. Likewise, the relative velocity and the distance between the OOI and the vehicle 100 may be used to determine whether or not OOI data associated with an upcoming turn is rendered Rendering criteria may also be used to establish a priority between data associated with different OOIs. Thus, rendering of data associated with a collision risk above a predetermined threshold may be prioritized over rendering of data associated with navigation. Likewise, rendering of data associated with a collision risk with a pedestrian may be prioritized over rendering of data associated with a collision risk with a vehicle.

Prioritizing between data associated with different OOIs may be dynamically determined. By way of example, the number of OOI data rendered may be limited when the vehicle 100 is moving to avoid confusing the operator. Furthermore, the lighting system can also be used as a headlight. In this case, the number of OOI renderings may be limited to ensure that a minimum headlight beam pattern intensity is maintained. In contrast, the number of OOI renderings may be unconstrained if the vehicle 100 is stationary.

Other dynamic rendering criteria may be related to the relative position of the vehicle 100, the OOI, and other vehicles. For example, generation of a beam of light into a zone surrounding other vehicles in the vicinity of the vehicle 100 may be prohibited.

One example of OOI data rendered outside of the vehicle 100 is depicted in FIG. 4. In FIG. 4, the vehicle 100 is depicted approaching an intersection 200 between a road 202 and a road 204. A headlight pattern 206 formed by the headlights of the vehicle 100 illuminates a portion of the road 202 which the vehicle 100 is following. Only a small portion of a second road 204 is illuminated. The driver has previously used one of the I/O devices $104_x$, which may be a GPS navigation module, to inform the processor 106 of the driver's intended route which in this example includes turning onto the road 204. Thus, the processor 106 determines that the intersection 200 is an OOI. Accordingly, as the vehicle 100 approaches the intersection 200, the processor 106 accesses the digital model 110 and determines the location of the intersection 200 with respect to the vehicle 100.

Once the rendering criteria have been met for the intersection 200, the processor 106 controls the rendering system 1303, which in this example is associated with the driver's side fog lamp, to render OOI data outside of the vehicle 100. The OOI data is in the form of an arrow 208. The location on the intersection 200 at which the arrow 208 is rendered is selected to guide the driver to turn onto the road 204. By rendering the arrow 208 with a fog lamp, which in this example emits a yellow light, the yellow arrow 208 is distinguishable from the headlight pattern 206.

In systems incorporating lighting sources of different colors, for example, lasers of different colors, the different colors may be used to indicate the nature of the OOI. Thus, navigational OOI data may be one color, and collision OOI data may be another color. Other OOI data that may be rendered includes the general outline of the road 204 and the name of the road 204.

In FIG. 5, the vehicle 100 is depicted approaching an intersection 210 with a stop sign 212. The headlight pattern 214 formed by the headlights of the vehicle 100 does not fully illuminate the stop sign 212. The location and dimensions of the stop sign 212, however, are stored in the road level view database 120. Additionally, the stop sign is identified in the road level view database as a mandatory traffic sign. Accordingly, the processor 106 determines that the stop sign 212 is an OOI. Thus, as the vehicle 100 approaches the stop sign 212, the processor 106 accesses the digital model 110 and determines the location of the stop sign 212 with respect to the vehicle 100.

Once the rendering criteria have been met for the stop sign 212, the processor 106 controls the rendering system $130_1$, which in this example is associated with the driver's side headlight, to render OOI data outside of the vehicle 100. The OOI data is in the form of a beam 216 which is directed out of the headlight pattern 214. The size of the beam 216 may be a function of the size of the sign 212 and the location of the sign 212 relative to the vehicle 100. In the event a vehicle is approaching the intersection along the road 218, the processor 106 may modify the OOI data to avoid blinding the oncoming driver. By way of example, the processor 106 may control the rendering system $130_1$ to form a bright line within the headlight pattern 214 pointed in the direction of the sign 212.

Figure 6:
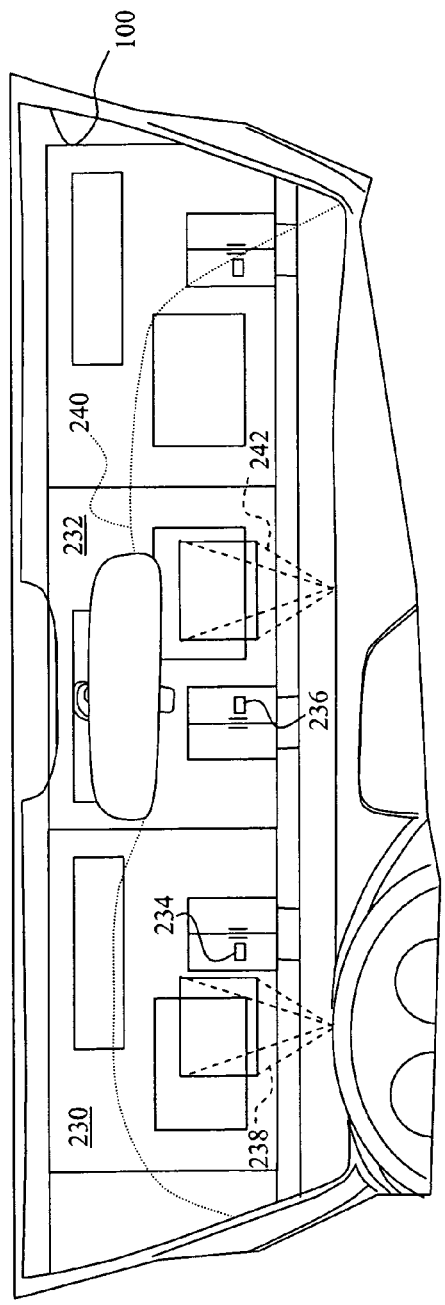
FIG. 6 depicts a plan view through the windshield of the vehicle of FIG. 1 wherein object of interest data in the form of numbers and letters have been rendered on store fronts by external light assemblies of the vehicle.

In FIG. 6, the vehicle 100 is depicted positioned in front of two retail stores 230 and 232. The stores 230 and 232 have placards 234 and 236, respectively, setting forth the hours of operation of the respective store The placards 234 and 236 are not sized, however, so as to be easily read by an occupant in the vehicle 100. The driver or other occupant of the vehicle 100, however, has used one of the I/O devices $104_x$ to inform the processor 106 that the stores 230 and 232 are OOIs.

Accordingly, the processor 106 accesses the digital model 110 and determines the identity of the retail stores 230 and 232. Using this data, the processor accesses the directory database 118 and obtains data associated with the retail stores 230 and 232 including the operating hours of the retail stores 230 and 232.

Once the rendering criteria have been met, which may include an input from an I/O deice $104_x$, the processor 106 controls the rendering system $130_1$, which in this example is associated with the driver's side headlight, to render OOI data outside of the vehicle 100. The OOI data is in the form of a beam 238 which is formed within the headlight pattern 240. The beam 238 renders the hours of operation of the store 230 on the store 230. The processor 106 also controls the rendering system $130_2$, which in this example is associated with the passenger side headlight, to render OOI data outside of the vehicle 100. The OOI data is in the form of a beam 242 which is formed within the headlight pattern 240. The beam 242 renders the hours of operation of the store 232 on the store 232.

Figure 7:
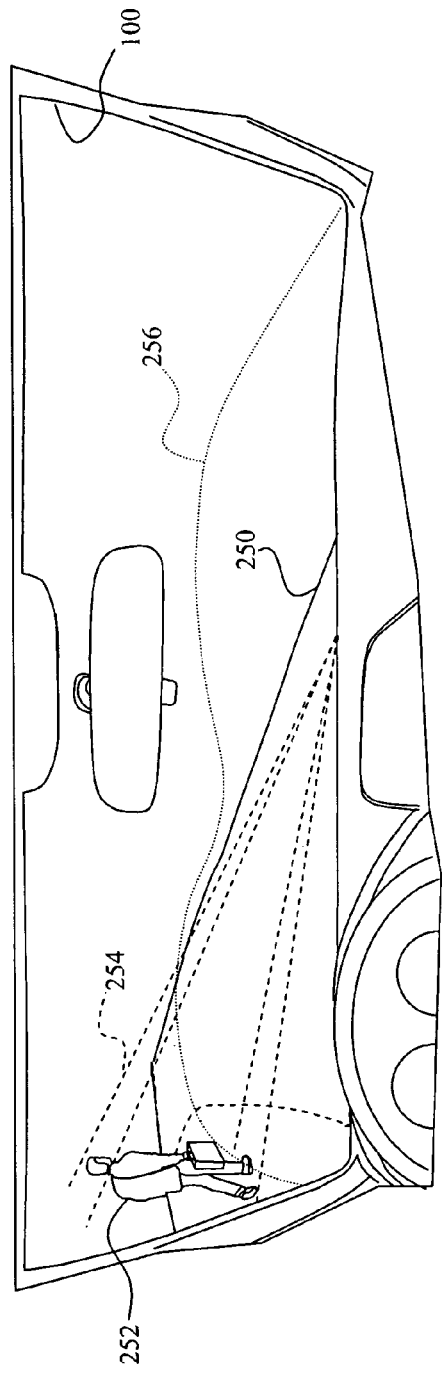
FIG. 7 depicts a plan view through the windshield of the vehicle of FIG. 1 wherein object of interest data in the form of a beam of light has been rendered on a pedestrian by an external light assembly of the vehicle.

In FIG. 7, the vehicle 100 is depicted moving along a road 250. A pedestrian 252 is crossing the road 250 but is not fully illuminated by the headlight pattern 254 formed by the headlights of the vehicle 100. The vehicle sensors $128_x$, however, have detected the pedestrian 252. Based upon data from the sensors $128_x$, the processor 106 has identified the pedestrian 252 as a pedestrian on a collision path with the vehicle 100. Accordingly, the processor 106 determines that the pedestrian 252 is an OOI.

In assessing the rendering criteria for a pedestrian on a collision path, the processor 106 further identifies an oncoming vehicle (not shown) travelling along the road 250 in a direction opposite to the vehicle 100. In this exemplary situation, a beam of light rendered by the rendering system $130_1$ (the driver's side headlight) would blind the oncoming driver. Accordingly, so as to avoid blinding the oncoming driver, the processor 106 controls the rendering system $130_2$, which in this example is associated with the passenger side headlight, to render OOI data outside of the vehicle 100.

The OOI data is in the form of a beam 254 which is directed out of the headlight pattern 256 so as to illuminate the pedestrian 252. By using the passenger side headlight, the beam 254 is directed along an axis which crosses the road 250 at an angle greater than an angle of a beam of light directed at the pedestrian 252 that is generated by the rendering system $130_1$. Thus, the potential for blinding the oncoming driver has been reduced.

The foregoing processes may be modified in a number of ways within the scope of the invention. By way of example, many of the steps may be performed in different sequences. Additionally, different types of information may be used in determining the OOI data to be rendered. Thus, while this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

We claim:

1. An adaptive external vehicle lighting system comprising:
   a vehicle communication network;
   a memory including an atlas database, a directory database, and program instructions for
      generating a model of a vehicle and an environment outside of the vehicle,
      identifying an object of interest based upon the generated model,
      analyzing rendering criteria associated with the identified object of interest, and
      rendering object of interest data based upon the analysis;
   a processor operably connected to the vehicle communication network and to the memory and configured to execute the program instructions; and
   at least one rendering system operably connected to the processor through the vehicle communication network and configured to render the object of interest data using an associated external lighting system of the vehicle, wherein the object of interest data includes data, obtained from the directory database, which is associated with the identified object of interest.

2. The system of claim 1, wherein the generated a model comprises:
   a three dimensional model of the vehicle and the environment outside of the vehicle.

3. The system of claim 1, wherein the at least one rendering system comprises:
   a first rendering system associated with a first external lighting assembly; and
   a second rendering system associated with a second external lighting assembly.

4. The system of claim 1, wherein:
   the vehicle includes a plurality of headlight assemblies; and
   the associated external lighting system includes a lighting source separate from a lighting source of the plurality of headlight assemblies.

5. The system of claim 4, wherein the associated external lighting system lighting source comprises:
   a laser.

6. The system of claim 1, wherein the program instructions comprise:
   program instructions for diverting, from a vehicle headlight pattern formed by a vehicle headlight assembly, a light beam.

7. The system of claim 1, wherein the program instructions comprise:
   program instructions for rendering a message readable by an occupant of the vehicle on the object of interest.

8. The system of claim 1, wherein the object of interest data includes one or more of:
   contact information data;
   hours of operation data; and
   merchandise information data.

9. A method of rendering data outside of a vehicle comprising:
   generating a model of a vehicle and an environment outside of the vehicle based upon atlas data stored in an atlas database;
   identifying an object of interest based upon the generated model;
   analyzing rendering criteria associated with the identified object of interest; and
   controlling a first rendering system through a vehicle communication system to render first object of interest data using a first associated external lighting system of the vehicle, wherein the first object of interest data includes directory data obtained from a directory database, the directory data associated with the identified object of interest.

10. The method of claim 9, wherein the generated model comprises:
    a three dimensional model of the vehicle and the environment outside of the vehicle.

11. The method of claim 9, wherein using the first associated external lighting system of the vehicle comprises using a headlight assembly.

12. The method of claim 9, further comprising:
    controlling a second rendering system through the vehicle communication system to render second object of interest data using a second associated external lighting system of the vehicle.

13. The method of claim 9, further comprising:
    energizing a plurality of headlight assembly light sources; and
    energizing a rendering light source separate from the plurality of headlight assembly light sources,
    wherein using the first associated external lighting system comprises using the rendering light source.

14. The method of claim 9, wherein controlling the first rendering system comprises:
    controlling at least one of a plurality of digital micromirrors in a headlight assembly.

15. The method of claim 9, wherein the directory data includes one or more of:
    contact information data;
    hours of operation data; and
    merchandise information data.

16. A vehicle information system comprising:
    a vehicle communication network;
    a memory including program instructions for
       generating a model of a vehicle and a plurality of objects located within an area outside of the vehicle based upon atlas from an atlas database,
       identifying a first of the plurality of objects as a first object of interest based upon the generated model,
       analyzing rendering criteria associated with the identified first object of interest,
       obtaining first object of interest data from a directory database, and
       rendering the first object of interest data based upon the analysis;
    a processor operably connected to the vehicle communication network and to the memory and configured to execute the program instructions;
    a lighting system configured to provide illumination within the area outside of the vehicle; and
    a rendering system operably connected to the lighting system and to the processor through the vehicle communication network and configured to render the first object of interest data.

17. The system of claim 16, wherein:
    the atlas data includes data for generating a three dimensional model of the vehicle and the plurality of objects located within the area outside of the vehicle.

18. The system of claim 17, further comprising:
    at least one sensor, the at least one sensor configured to obtain sensory data associated with at least one of the plurality of objects located within the area outside of the vehicle, wherein the program instructions include program instructions for updating the generated model based upon the sensory data.

19. The system of claim 17, further comprising:
  at least one input/output device, the at least one input/output device configured to obtain data associated with at least one of the plurality of objects located within the area outside of the vehicle from a location remote from the vehicle, wherein the program instructions include program instructions for updating the generated model based upon the obtained data.

20. The system of claim 16, wherein the first object of interest data includes one or more of:
  contact information data;
  hours of operation data; and
  merchandise information data.

* * * * *